United States Patent
Wada et al.

(10) Patent No.: US 6,495,240 B1
(45) Date of Patent: Dec. 17, 2002

(54) PATTERNED MAGNETIC RECORDING MEDIUM POSSESSING RECORDING PORTIONS WITH A LOWER HEIGHT THAN THE SURROUNDING NON-MAGNETIC MATRIX

(75) Inventors: Yoshimitsu Wada; Tsutomu Aoyama, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/500,544

(22) Filed: Feb. 9, 2000

(30) Foreign Application Priority Data

Feb. 10, 1999 (JP) .......................... 11-033243

(51) Int. Cl.⁷ ................................ G32B 3/00
(52) U.S. Cl. ...................... 428/156; 428/213; 428/163; 428/168; 428/312.8; 428/409; 428/694 TR
(58) Field of Search .................. 428/168, 323, 428/312.8, 694 TR, 694 BR, 900, 156, 213, 163, 409; 360/135; 369/275.4

(56) References Cited

U.S. PATENT DOCUMENTS

| | | | |
|---|---|---|---|
| 5,626,941 A | * 5/1997 | Ouano | 428/141 |
| 5,698,286 A | 12/1997 | Ikarashi et al. | |
| 5,843,569 A | * 12/1998 | Kaitsu et al. | 428/323 |
| 6,162,532 A | * 12/2000 | Black et al. | 428/323 |
| 6,168,845 B1 | * 1/2001 | Fontana, Jr. et al. | 428/65.5 |

FOREIGN PATENT DOCUMENTS

| | | | |
|---|---|---|---|
| JP | 62-062419 A | * | 3/1987 |
| JP | 4-95218 | | 3/1992 |
| JP | 9-297918 | | 11/1997 |

OTHER PUBLICATIONS

English Translation of Tokkyo Kokai JP 09-297918-A.*
English Translation of Tokkyo Kokai JP 62-062419-A.*
Derwent Translation of JP 62-062419-A (Image No. JP362062419A).*

* cited by examiner

Primary Examiner—Paul Thibodeau
Assistant Examiner—Kevin M. Bernatz
(74) Attorney, Agent, or Firm—Oblon, Spivak, McClelland, Maier & Neustadt, P.C.

(57) ABSTRACT

In conjunction with a so-called patterned medium comprising recording tracks each having an array of unit minute recording portions of a magnetic material separated by non-recording portions of a nonmagnetic material, the invention aims to prevent the recorded information from being disrupted by contact of a magnetic head slider with the medium. The magnetic recording medium of the invention includes recording tracks each having an array of unit minute recording portions (14) of a magnetic material separated by non-recording portions (16) of a nonmagnetic material. The surface height of the unit minute recording portions (14) is set lower than the surface height of the non-recording portions (16).

4 Claims, 4 Drawing Sheets

PATTERNED MAGNETIC RECORDING MEDIUM POSSESSING RECORDING PORTIONS WITH A LOWER HEIGHT THAN THE SURROUNDING NON-MAGNETIC MATRIX

BACKGROUND OF THE INVENTION

1. Technical Field

This invention relates to a magnetic recording medium, more particularly, to a magnetic recording medium for use in magnetic read/write equipment such as magnetic disk equipment known as hard disk drives (HDD), and further particularly, to the structure of a magnetic recording medium having a high recording density.

2. Background Art

High-capacity storage devices, especially hard disk drives featuring a high data transfer rate, quick access, high reliability and low price have marked a significant advance toward higher capacity and higher density. An improvement in areal recording density is accomplished by miniaturizing recording magnetic domains formed in the magnetic recording layer. At present, the density has exceeded 5 gigabits per square inch, with development efforts being made with the target on 10 gigabits to 100 gigabits.

Used as the magnetic head for write and read operation is a combined magnetic head in which an inductive head as the write head is combined with a magnetoresistive head (MR head) as the read head. Since the output of the MR head is determined by a magnetic flux change per circumferential unit length, in principle, the output does not decline even when the track width is minimized. The use of the MR head thus suggests a possibility to realize narrow tracks. The same applies to a giant magnetoresistive head (GMR head) with which a higher recording density is expected.

However, if the track width is too narrow, the interference or crosstalk between magnetic signals from adjacent recording tracks increases so that the degradation of read signals becomes a problem.

The areal recording density can also be increased by reducing the recording bit length. If the recording bit length is too short, the interference or partial erasure between magnetic signals from adjacent bits increases so that the degradation of read signals becomes a problem.

JP-A 9-297918 discloses a magnetic recording medium in which a plurality of recording portions are provided in the form of rectangular regions having two side lengths equal to a track width and a minimum bit-determining length, the plurality of recording portions are separated by space areas, and information is stored in the recording portions. This medium is a so-called patterned medium. The patterned medium is effective for suppressing the degradation of read signals by crosstalk and partial erasure.

For the achievement of a high recording density, it is also requisite to reduce the flying height of a slider having a magnetic head mounted thereon. However, reducing the flying height of a slider increases the frequency at which the slider comes in contact with the magnetic recording medium by disturbances. In the event of slider rubbing, the magnetic recording layer can be flawed whereby the recorded information is disrupted. For the patterned medium, however, effective means for avoiding the disruption of recorded information by the contact of the medium with the slider has not heretofore been proposed.

SUMMARY OF THE INVENTION

In conjunction with a so-called patterned medium comprising recording tracks each having an array of unit minute recording portions of a magnetic material separated by non-recording portions of a nonmagnetic material, an object of the invention is to prevent the recorded information from being disrupted by contact of a magnetic head slider with the medium.

This and other objects are attained by the present invention which is defined below.

(1) A magnetic recording medium comprising recording tracks each having an array of unit minute recording portions of a magnetic material separated by non-recording portions of a nonmagnetic material, the unit minute recording portions having a lower surface height than the non-recording portions.

(2) The magnetic recording medium of (1) wherein the surface height of the unit minute recording portions is 5 to 30 nm lower than the surface height of the non-recording portions.

(3) The magnetic recording medium of (1) wherein each unit minute recording portion is a single magnetic domain.

(4) The magnetic recording medium of (1) wherein the unit minute recording portions are constructed of any one of Co, Co—Cr, Co—Cr—Ta and Co—Cr—Pt.

OPERATION AND BENEFITS

In the magnetic recording medium of the invention, the surface height of the unit minute recording portions is set lower than the surface height of the non-recording portions. Even when the slider rubs the surface of the medium during magnetic write/read operation, the slider does not contact the unit minute recording portions. Accordingly, the recorded information is not disrupted even if the flying height of the slider is reduced in order to improve the recording density.

One means employed in the prior art for preventing a slider from being stuck to the surface of a medium is to form a magnetic recording layer on a locally raised and depressed surface of a substrate so that the medium surface may become locally raised and depressed. By contrast, the medium of the invention eliminates a need for a special structure for preventing sticking because the unit minute recording portions and non-recording portions of different surface heights form depressions and protrusions.

DESCRIPTION OF THE PREFERRED EMBODIMENTS

Figure 1:
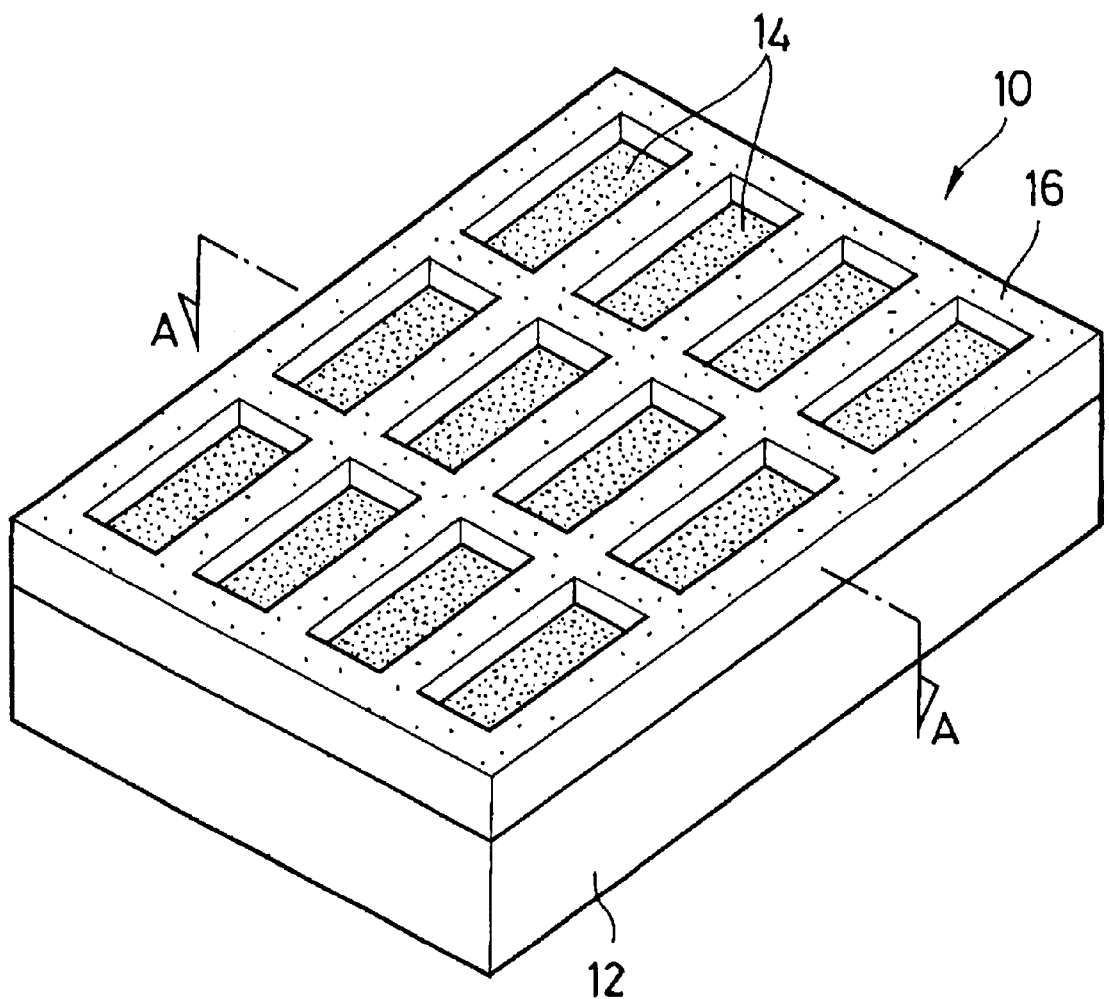
FIG. 1 is an enlarged perspective view of a portion of a magnetic recording medium according to one embodiment of the invention.
Figure 2:
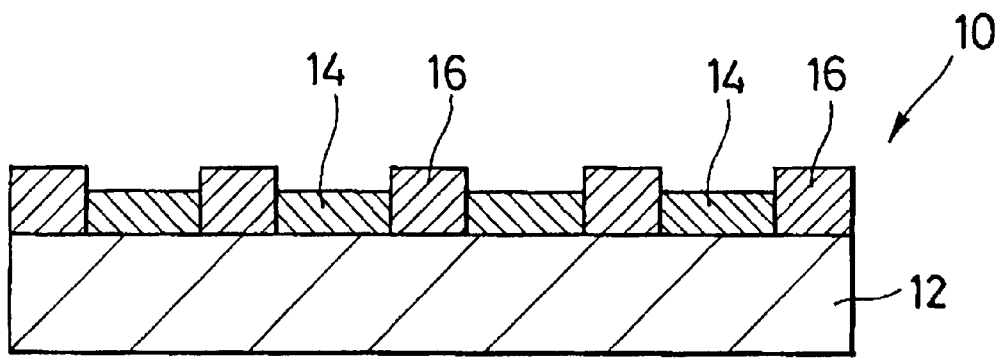
FIG. 2 is a cross-sectional view of the magnetic recording medium taken along lines A—A in FIG. 1.

The invention is mainly applied to magnetic disk media. Referring to FIG. 1, a magnetic disk medium according to one embodiment of the invention is shown in perspective view.

The magnetic disk medium 10 illustrated in FIG. 1 includes a disk-shaped substrate 12 and has a plurality of unit minute recording portions 14 arranged on the substrate in a concentric or spiral pattern and circumferentially and radially spaced apart from each other, and non-recording portions 16 intervening between adjacent unit minute recording portions 14. The unit minute recording portions 14 are constructed of a magnetic material capable of magnetically recording information whereas the non-recording portions 16 are constructed of a nonmagnetic material. Since the unit minute recording portions 14 are almost completely magnetically isolated from each other, the crosstalk or partial erasure between adjacent unit minute recording portions is prevented.

According to the invention, the surface height of the unit minute recording portions 14 is set lower than the surface height of the non-recording portions 16. Namely, the surface of unit minute recording portions 14 is depressed relative to the surface of the non-recording portions 16. In the inventive medium, the information recorded in the unit minute recording portions 14 is not disrupted even when the slider rubs the medium surface. Since microscopic raised and depressed portions are present on the medium surface, the medium of the invention prevents the slider from sticking to the medium surface.

The distance of depression of the surface of unit minute recording portions 14 relative to the surface of non-recording portions 16, that is, the difference in surface height therebetween is preferably 5 to 30 nm, and more preferably 5 to 20 nm. A too small depression distance may compromise the benefits of the invention whereas a too large depression distance may make it difficult to produce sufficient read outputs.

Preferably each unit minute recording portion 14 has a single magnetic domain structure. The single magnetic domain structure permits the size of crystal grains of which the unit minute recording portion is constructed to be increased, which is effective for restraining the degradation of magnetization by thermal disturbances. The single magnetic domain structure also permits the switching speed of magnetization to be accelerated.

The shape of unit minute recording portions 14 is not critical although a shape having a major axis and a minor axis is preferred. A rectangular shape as shown in FIG. 1 is one example while a shape obtained by cutting an ellipsoid of revolution into substantially equal halves is also acceptable. In order to increase the bit density and produce sufficient outputs, the unit minute recording portions 14 are preferably configured to a shape having major and minor axes and arranged such that the major axis may be parallel to the track width direction (disk radial direction) and the minor axis be parallel to the track longitudinal direction (disk circumferential direction).

The dimensions of unit minute recording portions 14 are not critical although it is preferred that the major axis have a length of about 0.1 to 1.0 $\mu$m, the minor axis have a length of about 0.05 to 0.5 $\mu$m, and the thickness be about 10 to 100 nm.

The magnetic material of which the unit minute recording portions 14 are constructed is not critical. The preferred materials are Co, Ni, Fe, and alloys containing at least one of these elements, with Co, Co—Cr, Co—Cr—Ta or Co—Cr—Ti being especially preferred. It is noted that the invention is applicable to either longitudinally magnetizable media or perpendicularly magnetizable media.

Figure 3:
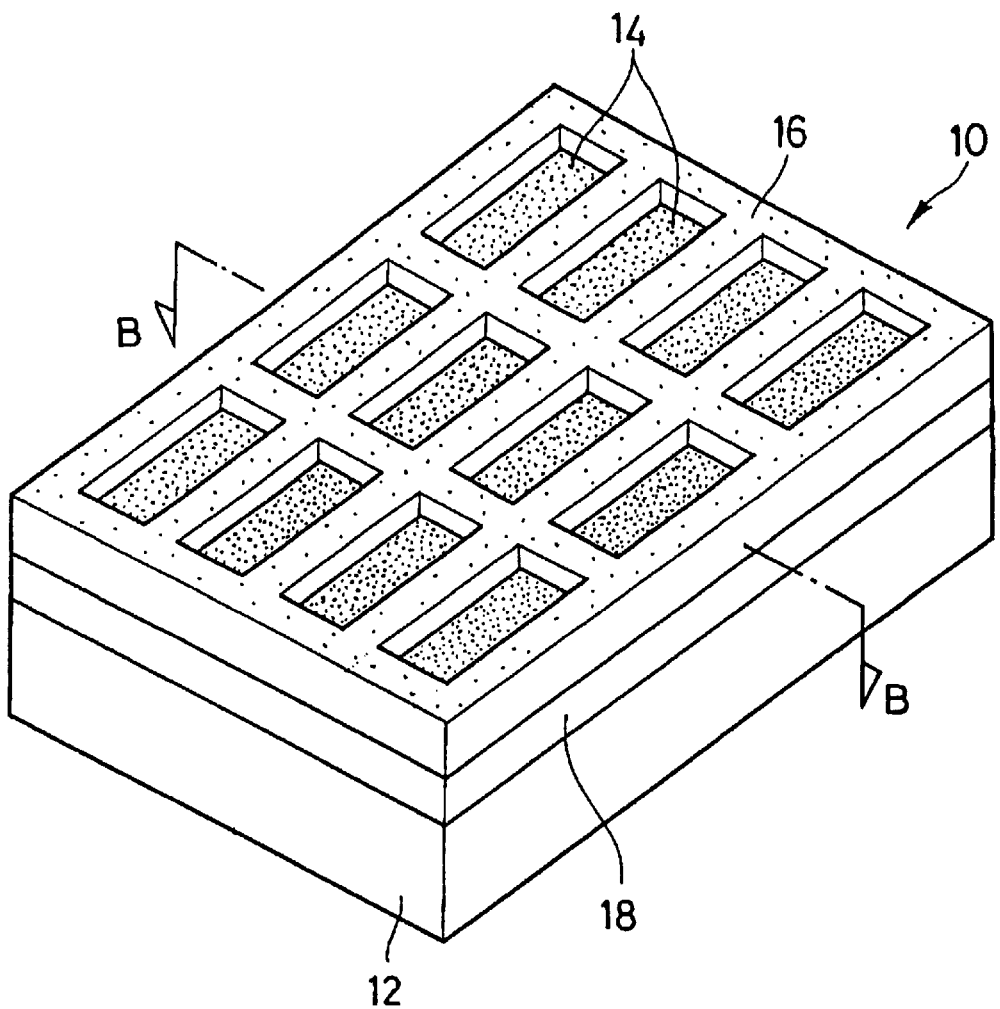
FIG. 3 is an enlarged perspective view of a portion of a magnetic recording medium according to another embodiment of the invention.
Figure 4:
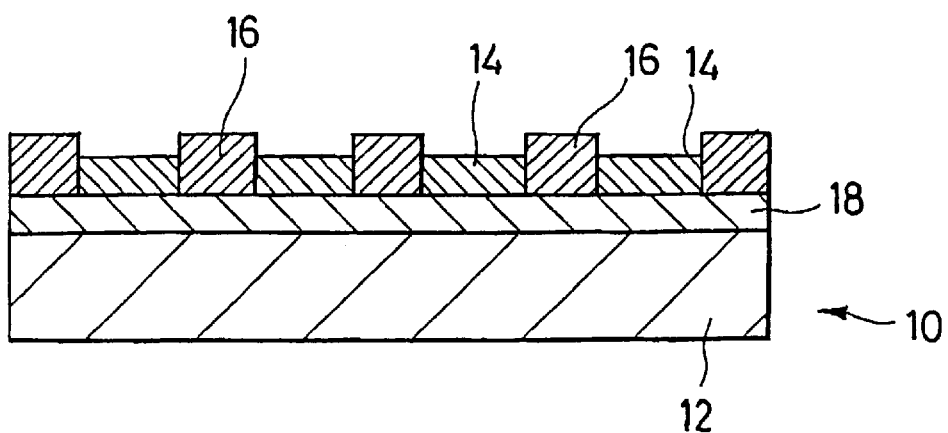
FIG. 4 is a cross-sectional view of the magnetic recording medium taken along lines B—B in FIG. 3.

In the magnetic recording medium of the invention, as shown in FIGS. 3 and 4, a back layer 18 for controlling orientation may be formed between the substrate 12 and the unit minute recording portions 14 and contiguous to the unit minute recording portions 14. The composition of the back layer 18 may be suitably determined in accordance with the material of the unit minute recording portions 14 such that the desired orientation is obtained. For example, in the case of a longitudinally magnetizable medium wherein the unit minute recording portions 14 are constructed of the above-mentioned Co—Cr base magnetic material, the back layer 18 is preferably constructed of any one of Ti, Ru, Ge, Zr and Cr. When the invention is applied to a perpendicularly magnetizable medium, a soft magnetic back layer is usually formed between the substrate 12 and the unit minute recording portions 14.

Further, like prior art media, a protective layer or lubricating layer may be provided on the medium surface to protect the medium surface from contact with the magnetic head. The protective layer may be formed, for example, of carbon or $SiO_2$ and by sputtering or the like. The lubricating layer may be formed of well-known lubricants and by spin coating or the like.

The nonmagnetic material of which the non-recording portions 16 are constructed is selected, for example, from oxides such as $SiO_2$, $Al_2O_3$ and $TiO_2$, nitrides such as $Si_3N_4$, AlN and TiN, carbides such as TiC, borides such as BN, and polymers of C, CH and CF systems.

The substrate 12 may be constructed of conventional magnetic disk substrate materials such as aluminum alloys, glass and silicon. The substrate 12 usually has a thickness of about 500 to 1,000 $\mu$m.

Figure 5:
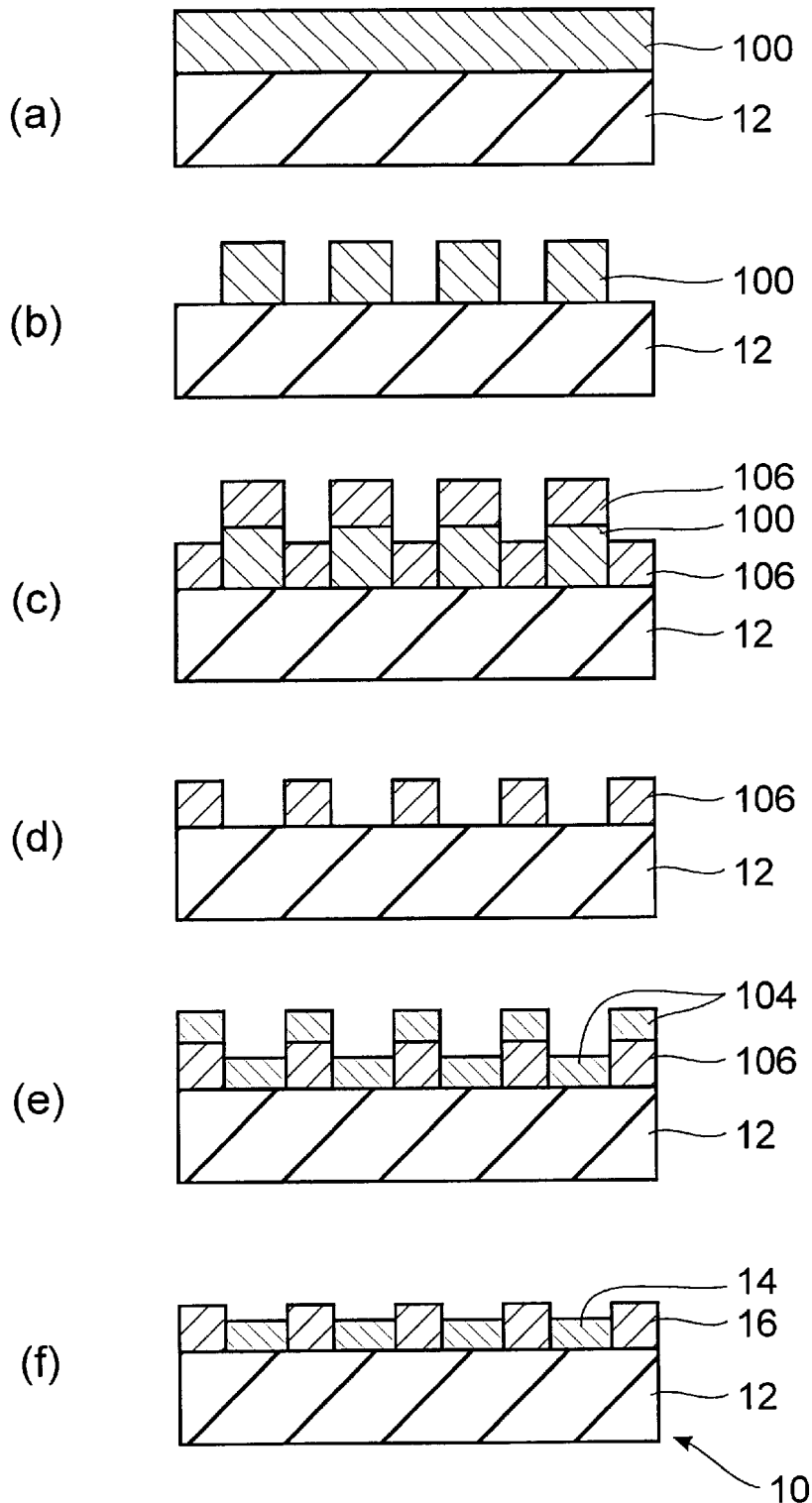
FIG. 5 illustrates in cross-sectional view the steps of one exemplary method for preparing the magnetic recording medium of the invention.

Next, referring to FIG. 5, one exemplary method for preparing the magnetic recording medium of the invention is described.

In this method, a photoresist layer 100 is first formed on a substrate 12 by coating as shown in FIG. 5(*a*).

Then, the photoresist layer 100 is patterned by photolithography to a shape as shown in FIG. 5(*b*). In depressions defined by this patterning, the photoresist is completely removed and the surface of the substrate 12 is exposed. In the depressions, non-recording portions 16 are finally formed. In the practice of photolithography, use may be made of exposure through a mask, exposure using a laser capable of controlling the position of irradiation, and exposure using an electron beam tube.

Then, as shown in FIG. 5(*c*), a nonmagnetic material 106 is deposited on the photoresist layer 100 and the exposed surface of the substrate 12 by sputtering or the like. At this point, the deposition thickness of the nonmagnetic material 106 is preferably set smaller than the thickness of the photoresist layer 100 as seen from the figure. This facilitates removal of the photoresist layer 100.

Then, the photoresist layer 100 is removed by a resist remover liquid, with the nonmagnetic material 106 overlying the photoresist layer being simultaneously removed. As a consequence, only the nonmagnetic material 106 deposited on the surface of the substrate 12 is left behind as shown in FIG. 5(*d*). Note that the resist remover liquid used herein may be acetone or MEK, for example.

Then, a magnetic material 104 is deposited on the nonmagnetic material 106 and the exposed surface of the substrate 12 by sputtering or the like, giving a structure as shown in FIG. 5(*e*). Subsequently, the magnetic material 104 deposited on the nonmagnetic material 106 is removed by chemical and mechanical polishing. This results in a magnetic disk medium 10 in which the surface height of unit minute recording portions 14 is lower than the surface height of non-recording portions 16 as shown in FIG. 5(f). It is noted that the deposition thickness of the magnetic material 104 in FIG. 5(e) is selected such that the difference between the surface height of unit minute recording portions 14 and the surface height of non-recording portions 16 may become the desired value at the end of chemical and mechanical polishing.

Figure 6:
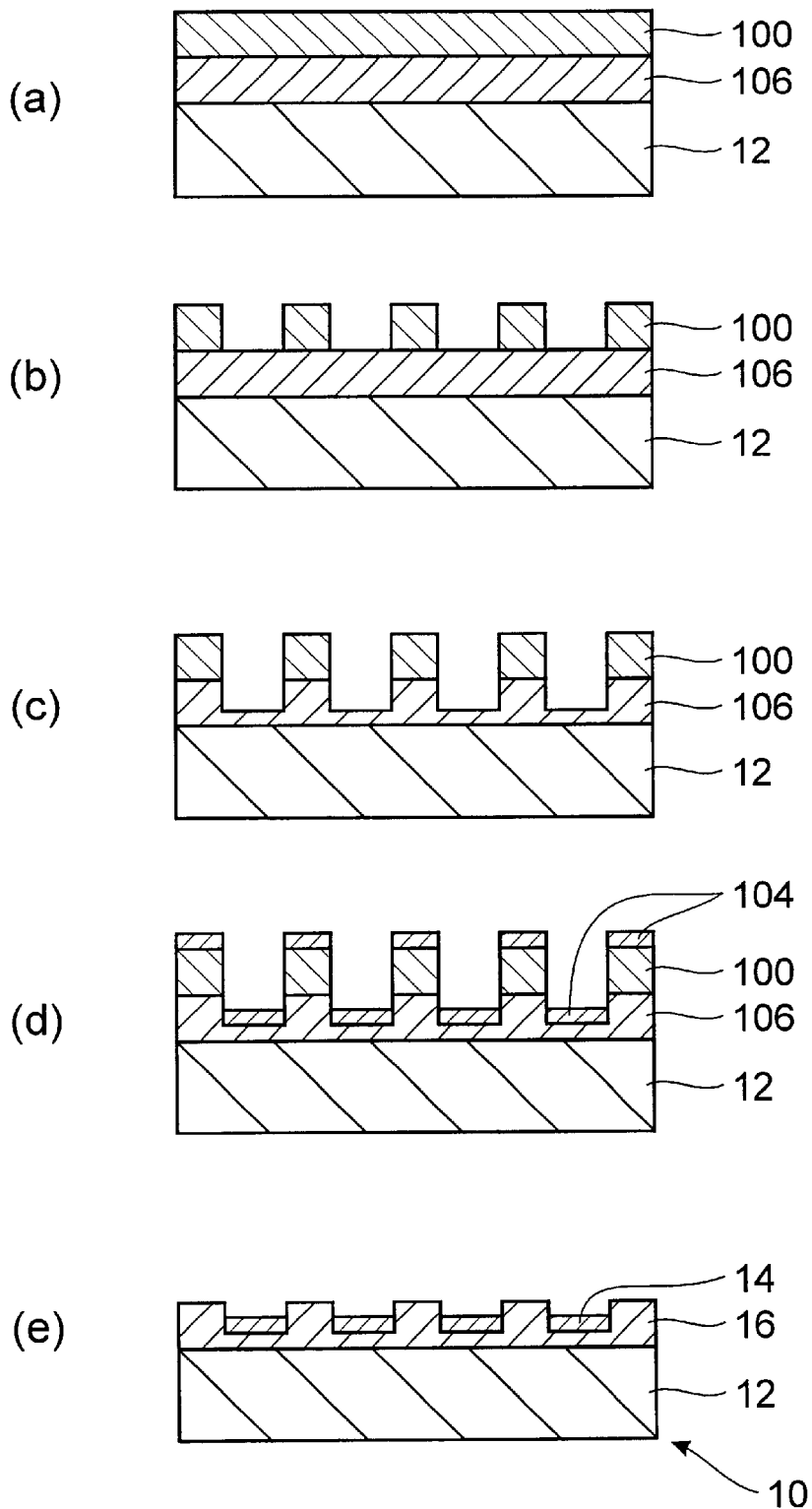
FIG. 6 illustrates in cross-sectional view the steps of another exemplary method for preparing the magnetic recording medium of the invention.

Next, referring to FIG. 6, another exemplary method for preparing the magnetic recording medium of the invention is described.

In this method, as shown in FIG. 6(a), a nonmagnetic material 106 is first deposited on a substrate 12 by sputtering or the like, and a photoresist layer 100 is then formed thereon by coating.

Then, the photoresist layer 100 is patterned by photolithography to a shape as shown in FIG. 6(b). In depressions defined by this patterning, the photoresist is completely removed and the surface of the nonmagnetic material 106 is exposed.

Then, using the photoresist layer 100 as a mask, the nonmagnetic material 106 is etched by reactive ion etching (RIE) or the like. At this point, the etching of the nonmagnetic material 106 may be effected to only a part of its height as shown in FIG. 6(c) or continued until the surface of the substrate 12 is exposed.

Then, a magnetic material 104 is deposited on the exposed surface of the nonmagnetic material 106 and the photoresist layer 100 by sputtering or the like, giving a structure as shown in FIG. 6(d). Subsequently, the photoresist layer 100 is removed by a resist remover liquid, with the magnetic material 104 overlying the photoresist layer being simultaneously removed. This results in a magnetic disk medium 10 in which the surface height of unit minute recording portions 14 is lower than the surface height of non-recording portions 16 as shown in FIG. 6(e). It is noted that the deposition thickness of the magnetic material 104 in FIG. 6(d) is selected such that the difference between the surface height of unit minute recording portions 14 and the surface height of non-recording portions 16 may become the desired value.

EXAMPLE

A combined magnetic head was fabricated by mounting a write head and a read head on a 30% slider which was made of AlTiC (Al$_2$O$_3$—TiC) to dimensions of 1.235 mm longitudinal, 1.0 mm transverse and 0.3 mm high and a weight of 1.5 mg. The write head used was an inductive head having a magnetic pole width of 0.1 μm and a gap distance of 0.2 μm, and the read head used was a MR head.

A magnetic disk medium was fabricated by the method shown by the flow diagram of FIG. 5. The unit minute recording portions 14 were rectangular and their dimensions were 0.2 μm in the transverse direction of recording tracks, 0.1 μm in the longitudinal direction of recording tracks, and 20 nm thick. The dimensions of spaces between adjacent unit minute recording portions 14, that is, the dimensions of non-recording portions 16 were 0.16 μm in the transverse direction of recording tracks, 0.08 μm in the longitudinal direction of recording tracks, and the non-recording portions were 40 nm thick. Consequently, the depression distance of the surface of unit minute recording portions 14 relative to the surface of non-recording portions 16 was 20 nm. The track pitch was 0.36 μm (70 kTPI) and the bit pitch was 0.18 μm (141 kBPI). This recording density corresponds to 10 Gb/in$^2$.

Note that unit minute recording portions 14 had a single magnetic domain structure of cobalt with a coercivity (Hc) of 750 Oe and an axis of easy magnetization being aligned with the longitudinal direction of recording tracks. The non-recording portions 16 were constructed of carbon.

On the magnetic disk medium, signals were recorded by means of the combined magnetic head. The rotational speed of the magnetic disk medium was 10,000 rpm and the flying height of the slider was 25 nm. After recording, the magnetized state of the magnetic disk medium was observed under a magnetic force microscope (MFM) to find that unit minute recording portions had been magnetized in accordance with recording signals.

Next, with the rotational speed of the medium and the flying height of the magnetic head set as above, a contact-start-and-stop (CSS) test was repeated 50,000 cycles. As a result, the disruption of the recorded information by the sticking of the slider to the magnetic disk medium was not ascertained.

A comparative medium was fabricated as was the above magnetic disk medium except that both the unit minute recording portions 14 and the non-recording portions 16 were 20 nm thick, that is, had the same surface height. Note that in the comparative medium, a conventional texture treatment was effected on the substrate surface in order to prevent the slider from sticking to the medium surface.

On the comparative medium, signals were recorded under the same conditions as above, finding that recording could be effected like the medium of the invention. In the CSS test, however, some bits of recorded information could not read at the 12,000th cycle. The CSS test was interrupted at this point, and the medium surface was observed under MFM to find that the recorded information was disrupted in many unit minute recording portions.

The effectiveness of the invention is evident from the foregoing Example.

What is claimed is:

1. A magnetic recording medium comprising recording tracks each having an array of unit minute recording portions of a magnetic material separated by non-recording portions of a nonmagnetic material, said unit minute recording portions being exposed between said non-recording portions, said unit minute recording portions having a lower surface height than said non-recording portions.

2. The magnetic recording medium of claim 1 wherein the surface height of said unit minute recording portions is 5 to 30 nm lower than the surface height of said non-recording portions.

3. The magnetic recording medium of claim 1 wherein each said unit minute recording portion is a single magnetic domain.

4. The magnetic recording medium of claim 1 wherein said unit minute recording portions are constructed of a material selected from a group consisting of Co, Co—Cr, Co—Cr—Ta and Co—Cr—Pt.

* * * * *

UNITED STATES PATENT AND TRADEMARK OFFICE
CERTIFICATE OF CORRECTION

PATENT NO.     : 6,495,240 B1
DATED          : December 17, 2002
INVENTOR(S)    : Yoshimitsu Wada et al.

It is certified that error appears in the above-identified patent and that said Letters Patent is hereby corrected as shown below:

Column 3,
Line 17, insert -- and a higher surface height than the substrate 12 -- after "16."

Column 6,
Lines 42, 50, 54 and 57, insert -- patterned -- before "magnetic";
Line 42, insert -- a substrate and -- after "comprising";
Line 49, insert -- and a higher surface height than said substrate -- after "portions".

Signed and Sealed this

Twelfth Day of August, 2003

JAMES E. ROGAN
*Director of the United States Patent and Trademark Office*